(12) United States Patent
Lu et al.

(10) Patent No.: US 12,510,080 B2
(45) Date of Patent: Dec. 30, 2025

(54) FLUID PUMP AND ENCLOSURE PROVIDING STATOR HOLDER AND COOLING FOR MOTOR AND ELECTRONICS

(71) Applicant: Agilent Technologies, Inc., Santa Clara, CA (US)

(72) Inventors: Vannie Lu, Billerica, MA (US); George Galica, Worcester, MA (US)

(73) Assignee: Agilent Technologies, Inc., Santa Clara, CA (US)

( * ) Notice: Subject to any disclaimer, the term of this patent is extended or adjusted under 35 U.S.C. 154(b) by 24 days.

(21) Appl. No.: 18/082,417

(22) Filed: Dec. 15, 2022

(65) Prior Publication Data
US 2024/0200558 A1  Jun. 20, 2024

(51) Int. Cl.
*F04C 29/04* (2006.01)
*F04C 18/02* (2006.01)
(Continued)

(52) U.S. Cl.
CPC ........ *F04C 29/045* (2013.01); *F04C 18/0215* (2013.01); *F04C 29/0057* (2013.01);
(Continued)

(58) Field of Classification Search
CPC ........ F04C 18/0215–0223; F04C 29/045–047; F04C 29/0057; F04C 29/04–047;
(Continued)

(56) References Cited

U.S. PATENT DOCUMENTS 1,996,460 A * 4/1935 Coates .................... H02K 9/06
310/211
2,394,517 A * 2/1946 Ingalls ................ F04D 29/5806
310/60 R
(Continued)

FOREIGN PATENT DOCUMENTS

CN     104753206 A  *  7/2015  ............ F04C 29/045
CN     104838141 A  *  8/2015  .......... F04C 18/0215
(Continued)

OTHER PUBLICATIONS

Roderick, Alex, "What is an Electronically Commutated Motor (ECM)"; https://eepower.com/technical-articles/what-is-an-electronically-commutated-motor-ecm/#; Oct. 18, 2021; 7 pages.
(Continued)

*Primary Examiner* — Alexander B Comley (57) ABSTRACT

An enclosure for a fluid pump includes an outer shell defining an enclosure interior, a stator holder disposed in the enclosure interior and at least partially surrounding a motor stator of a motor, and conduits configured to direct air through the enclosure interior. The outer shell includes air inlets positioned to allow air to flow from an ambient space outside of the enclosure into the enclosure interior, and air outlets positioned to allow air to flow from the enclosure interior to the ambient space. The enclosure defines air flow paths running from at least some of the air inlets, to and through the air conduits, and from the air conduits to at least some of the air outlets, thereby cooling the motor during operation. Electronics may be positioned in the enclosure interior, which may also be cooled by the configuration of the enclosure.

15 Claims, 6 Drawing Sheets

(51) Int. Cl.
   *F04C 29/00* (2006.01)
   *F04D 25/06* (2006.01)
   *F04D 29/52* (2006.01)
   *F04D 29/58* (2006.01)
   *H02K 9/06* (2006.01)

(52) U.S. Cl.
   CPC ............ *F04C 29/047* (2013.01); *F04D 25/06* (2013.01); *F04D 29/522* (2013.01); *F04D 29/584* (2013.01); *H02K 9/06* (2013.01)

(58) Field of Classification Search
   CPC ............... F04C 18/0207; F04B 25/082; F04D 29/5806–5846; F04D 39/066; H02K 9/06; H02K 9/14–16
   See application file for complete search history.

(56) References Cited

U.S. PATENT DOCUMENTS

| | | | | |
|---|---|---|---|---|
| 2,778,958 | A * | 1/1957 | Hamm | H02K 9/14 310/63 |
| 3,135,882 | A * | 6/1964 | Mollenberg | H02K 9/14 310/43 |
| 3,610,975 | A * | 10/1971 | Onjanow | H02K 9/18 416/93 R |
| 3,643,119 | A * | 2/1972 | Lukens | H02K 9/06 310/60 R |
| 4,742,257 | A * | 5/1988 | Carpenter | H02K 9/14 310/58 |
| 5,081,384 | A * | 1/1992 | Rausch | H02K 9/14 310/63 |
| 5,430,931 | A | 7/1995 | Fisher et al. | |
| 5,513,953 | A * | 5/1996 | Hansen | F24F 7/10 415/213.1 |
| 5,714,816 | A * | 2/1998 | Jensen | H02K 11/33 310/68 R |
| 5,780,946 | A * | 7/1998 | Nakamura | H02K 9/16 310/58 |
| 6,503,069 | B2 * | 1/2003 | Moroi | F04C 29/045 417/372 |
| 6,731,036 | B2 * | 5/2004 | Ghiotto | H02K 11/33 310/58 |
| 7,329,108 | B2 * | 2/2008 | Tsuchiya | F04C 29/045 418/55.6 |
| 9,341,186 | B2 | 5/2016 | Calhoun | |
| 9,611,852 | B2 * | 4/2017 | Forni | F04D 25/08 |
| 2004/0241030 | A1 * | 12/2004 | Matsushima | F04C 29/04 418/83 |
| 2005/0011213 | A1 * | 1/2005 | Shindo | F04C 23/008 62/259.2 |
| 2005/0019169 | A1 * | 1/2005 | Kriehn | F04C 18/16 417/313 |
| 2007/0077159 | A1 * | 4/2007 | Tsuchiya | F04C 29/04 418/83 |
| 2008/0145214 | A1 * | 6/2008 | Metzger | F04C 23/00 415/182.1 |
| 2009/0194177 | A1 * | 8/2009 | Yokota | F04B 49/06 137/565.18 |
| 2009/0269220 | A1 * | 10/2009 | Nakagawa | F04C 23/008 62/505 |
| 2010/0111740 | A1 | 5/2010 | Ni | |
| 2010/0223947 | A1 * | 9/2010 | Shibuya | F04C 29/047 62/323.3 |
| 2013/0342051 | A1 * | 12/2013 | Leung | H02K 9/14 310/254.1 |
| 2014/0154122 | A1 * | 6/2014 | Sadakata | F04C 18/0215 418/55.1 |
| 2015/0078927 | A1 | 3/2015 | Forni | |
| 2015/0184656 | A1 * | 7/2015 | Forni | F04C 25/02 418/55.6 |
| 2015/0295532 | A1 * | 10/2015 | Sakai | F04C 28/06 318/472 |
| 2015/0322966 | A1 * | 11/2015 | Bratthäll | F04D 13/06 417/423.8 |
| 2017/0089624 | A1 * | 3/2017 | Yokoyama | F04C 29/028 |
| 2018/0355866 | A1 * | 12/2018 | Bahrami | F04C 25/02 |
| 2019/0162187 | A1 * | 5/2019 | Cappuzzo | F04C 18/32 |

FOREIGN PATENT DOCUMENTS

| | | | | |
|---|---|---|---|---|
| CN | 206422630 | U | | 8/2017 |
| CN | 109477486 | A * | 3/2019 | .......... F04C 18/0215 |
| DE | 3642724 | A1 * | 6/1988 | ............. H02K 17/30 |
| DE | 3711720 | A1 * | 10/1988 | ............. F24F 7/013 |
| DE | 3710622 | C2 * | 12/1990 | ............. H02K 5/207 |
| DE | 19634097 | C2 * | 7/1998 | ............. H02K 11/33 |
| DE | 102004037079 | A1 | | 3/2006 |
| DE | 102004031399 | B4 | | 4/2007 |
| DE | 102006013225 | A1 * | 10/2007 | ......... F04D 29/5806 |
| DE | 10362051 | B4 * | 5/2016 | ............. H02K 11/33 |
| EP | 1837978 | A1 * | 9/2007 | ............... H02K 7/14 |
| EP | 3127222 | B1 * | 1/2018 | ............... H02K 9/16 |
| GB | 2557359 | A * | 6/2018 | ............ F04B 39/066 |
| GB | 2557360 | A * | 6/2018 | ......... F04D 29/5806 |
| JP | H0953589 | A | | 2/1997 |
| JP | 4026099 | B2 * | 12/2007 | .............. F04C 29/04 |
| JP | 2007321563 | A * | 12/2007 | |
| JP | 4757993 | B2 * | 8/2011 | |
| JP | 6058512 | B2 * | 1/2017 | |
| KR | 102151143 | B1 | | 9/2020 |
| WO | WO-9506971 | A1 * | 3/1995 | ............. H02K 11/33 |
| WO | WO-2018155645 | A1 * | 8/2018 | .............. F04C 29/04 |

OTHER PUBLICATIONS

Thi Luu, Phuong; "Design and Analysis of a Permanent Magnet Synchronous Motor Considering Axial Asymmetric Position of Rotor to Stator"; https://www.mdpi.com/1996-1073/12/24/4816/htm; Dec. 17, 2019; 11 pages.

UK IPO Search Report under Section 17(5) dated May 29, 2024 for Application No. GB2319106.7; 5 pages.

* cited by examiner

FLUID PUMP AND ENCLOSURE PROVIDING STATOR HOLDER AND COOLING FOR MOTOR AND ELECTRONICS

TECHNICAL FIELD

The present invention generally relates to fluid pumps, and particularly to fluid pumps that include an enclosure providing support for a motor stator and cooling for a motor or both a motor and electronics.

BACKGROUND

Many types of pumps generally include a pump head coupled to a prime mover (typically a motor) by a rotating drive shaft, which may be a single shaft or two shafts coupled together (e.g., a motor shaft and a pump shaft). The pump head typically includes one or more movable pump elements that move relative to a stationary portion (a pump stator) of the pump head in a manner that pumps a working fluid (liquid or gas) from a pump inlet to a pump outlet, either for compressing or pressurizing the working fluid (e.g., in the case of a compressor pump) or for evacuating an enclosed space communicating with the pump inlet (by removing fluid from the enclosed space, e.g., in the case of a vacuum pump). The motor, typically an electric motor, generates the power utilized for moving the movable pump elements. An electric motor typically includes a motor rotor coupled to the drive shaft that rotates relative to a stationary motor stator. The motor rotor and the motor stator typically include electrically conductive windings, electromagnets and/or permanent magnets configured to couple the motor rotor and the motor stator by a magnetic field. Electrical power supplied to the windings or magnet(s) of the motor stator or motor rotor generates a magnetic field that couples the motor stator and the motor rotor as a magnetic circuit and thereby induces rotation of the motor rotor. The drive shaft transfers the as-generated power (in particular, torque) from the motor rotor to the movable pump elements. Various types of pumps have one or more movable pump elements that require such power, such as scroll pumps, rotary vane pumps, gear pumps, screw pumps, Roots-type pumps, claw pumps, impeller pumps, fans, piston pumps, etc. Typically, electronics for supplying power and controlling the pump and the motor are located at the pump.

Figure 1:
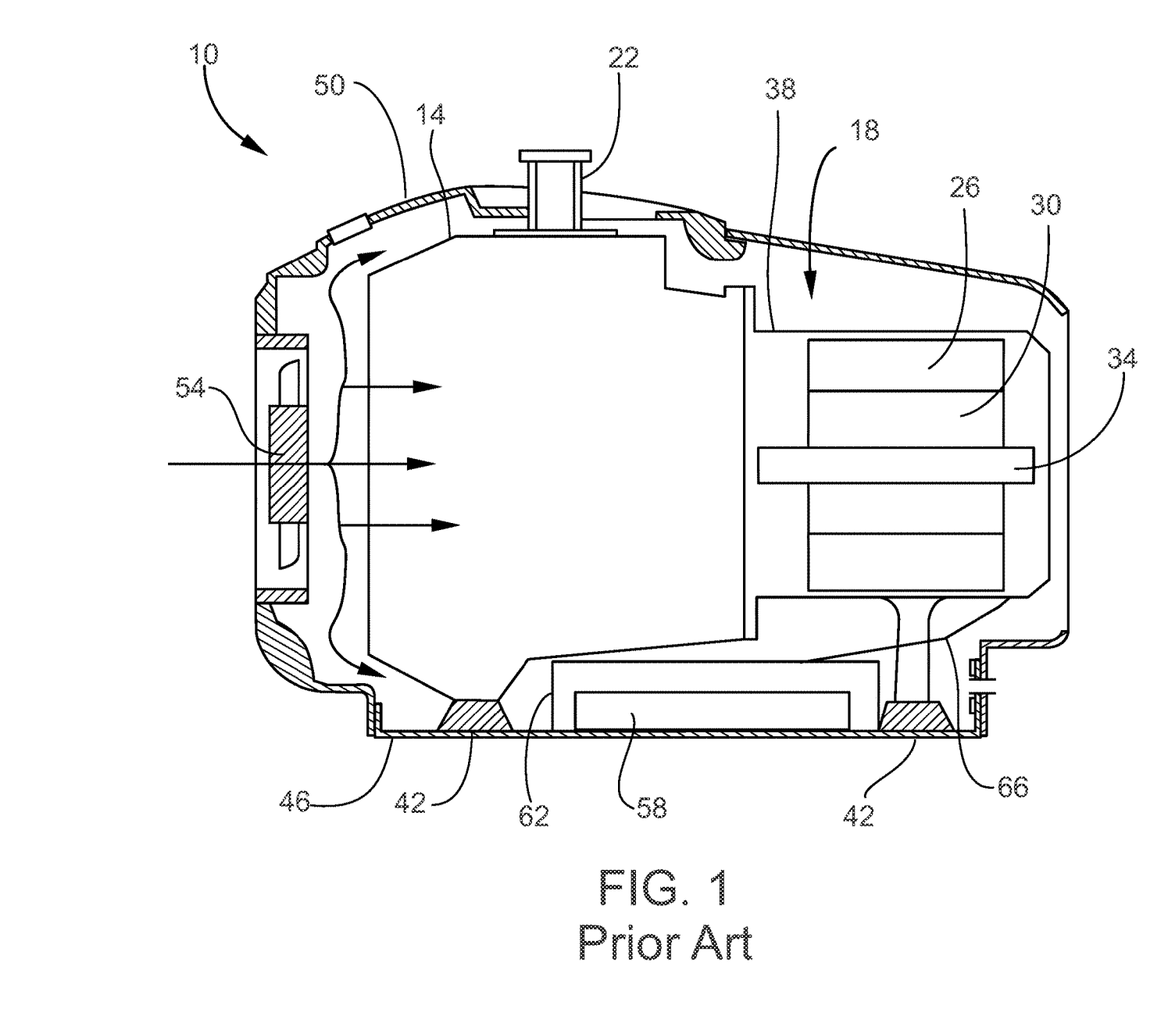
FIG. 1 is a cross-sectional, longitudinal side view of an example of an electric motor-driven fluid pump having a typical, known configuration.

FIG. 1 is a cross-sectional, longitudinal side view of an example of an electric motor-driven fluid pump 10 having a typical, known configuration. The pump 10 includes a pump head 14 and an electric motor 18. The pump head 14 includes one or more pumping stages defined by one or more pump stators and movable pump elements (not shown). In operation, the pump head 14 (pumping stage(s)) moves (pumps) a working fluid from a pump inlet 22 to a pump outlet (not shown). The motor 18 includes a stationary motor stator 26 and a motor rotor 30 that in operation rotates relative to the motor stator 26. The motor rotor 30 is attached to a drive shaft 34 which, as noted above, either extends to the movable pump element(s) of the pump head 14 as a single shaft or is coupled to a pump shaft that is directly coupled to the movable pump element(s). The motor 18 also includes a motor housing 38 enclosing the motor stator 26, motor rotor 30, and drive shaft 34. The motor housing 38 may be attached to a stationary portion of the pump head 14 either directly or through one or more intermediate structural members.

Typically, the pump head 14 and the motor 18 are mounted on pump mounts 42 configured to suppress vibrations during operation (e.g., constructed from a robust but deformable or elastic material such as rubber). A pump base or tray 46 is typically positioned at the bottom side of the pump 10, and supports the pump mounts 42 and, in turn, the pump head 14 and the motor 18. Typically, a cowling 50 encloses the lateral sides and the top side of both the pump head 14 and the motor 18. The cowling 50 may be attached to the tray 46, as illustrated. In this manner, the cowling 50 and the tray 46 cooperatively fully enclose all sides of the pump head 14 and the motor 18, except for openings needed for allowing air flow to and from the ambient (the space external to the pump 10), routing of electrical wiring, etc. The cowling 50 may provide various functions. For example, the cowling 50 may prevent a user from contacting hot surfaces of the pump 10, such as outer surfaces of the pump head 14 and the motor 18. For this purpose, the cowling 50 may be composed of a thermally insulating material such as a suitable plastic. The cowling 50 also may at least partially define internal passages for directing flows of cooling air through interior spaces of the pump 10, particularly to remove heat energy from the pump 10 by picking up and carrying away heat energy from heat-generating parts of the pump 10 (e.g., heat generated by friction or shear of moving components of the pump head 14, heat generated from the work of compressing the working fluid by the pump head 14, or additionally resistive heat generated by the motor 18, etc.), and exhausting the consequently heated air from the pump 10. The air flow paths through the pump 10 may be enhanced by providing a cooling fan 54 that is mounted to the cowling 50 or in an interior space of the pump 10 (at least partially) defined by the cowling 50. A few examples of flow paths for cooling air are depicted by arrows in FIG. 1.

The pump 10 also includes electronics 58 (e.g., inverter, one or more circuit boards, other electronic components, data loggers, etc.) configured for supplying electrical power to and controlling (e.g., motor speed) the motor 18, and thereby controlling (e.g., pumping speed) of the pump head 14. The electronics 58 are enclosed in an electronics housing or box 62 that is typically mounted on the tray 46. The electronics 58 communicate with the motor windings of the motor 18 via cables 66 that are typically supported in cable harnesses in the interior enclosed by the tray 46 and the cowling 50. Notably, in conventional configurations, the electronics box 62 is structurally (physically) separate from the housings of the pump head 14 and the motor 18, as illustrated in FIG. 1.

The conventional configuration shown in FIG. 1, with the electronics 58 and cables 66 being separate from and outside of the motor housing 38, can be problematic. The cables 66 can cause an excessive amount of electromagnetic conduction/electromagnetic induction (EMC/EMI), which can adversely affect the operations of the electronics 58 and the motor 18. Additionally, adequate cooling of the electronics 58 can require a separate cooling system (e.g., mounted at or in the electronics box 62) that is dedicated to cooling the electronics 58. Additionally, the configuration requires additional parts (hardware) and assembly processes.

There is an ongoing need for further developments in the field of fluid pump design, including for providing enclosures and cooling features for the motor and electronics of fluid pumps.

SUMMARY

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to an implementation the present disclosure, an enclosure for a fluid pump includes: an outer shell defining an enclosure interior; a stator holder disposed in the enclosure interior and configured to hold a motor stator; and a plurality of air conduits configured to direct air through the enclosure interior, wherein: the outer shell comprises a plurality of air inlets positioned to allow air to flow from an ambient space outside of the enclosure into the enclosure interior, and a plurality of air outlets positioned to allow air to flow from the enclosure interior to the ambient space; and the enclosure defines a plurality of air flow paths running from at least some of the air inlets, to and through the air conduits, and from the air conduits to at least some of the air outlets.

According to an implementation the present disclosure, a fluid pump includes: an enclosure according to any of the implementations disclosed herein; a pump head comprising a pump inlet, a pump outlet, and a movable pump element, wherein the pump head is configured to pump a fluid from the pump inlet to the pump outlet in response to movement of the movable pump element; and a motor comprising a motor rotor and the motor stator of a pump, and configured to drive the movement of the movable pump element.

According to an implementation the present disclosure, a fluid pump includes: a pump head comprising a pump inlet, a pump outlet, and a movable pump element, wherein the pump head is configured to pump a fluid from the pump inlet to the pump outlet in response to movement of the movable pump element; a motor comprising a motor rotor and a motor stator, and configured to drive the movement of the movable pump element; an electronics assembly; and an enclosure having a front side facing the pump head and a rear side opposing the front side, the enclosure including: an outer shell defining an enclosure interior; a stator holder disposed in the enclosure interior and at least partially surrounding the motor stator; and a plurality of air conduits configured to direct air through the enclosure interior in one or more directions from the rear side to the front side, wherein: the outer shell comprises a plurality of air inlets positioned to allow air to flow from an ambient space outside of the enclosure into the enclosure interior, and a plurality of air outlets positioned to allow air to flow from the enclosure interior to the ambient space; the enclosure defines a plurality of air flow paths running from at least some of the air inlets, to and through the air conduits, and from the air conduits to at least some of the air outlets; and the electronics assembly is disposed in the enclosure interior.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

The illustrations in all of the drawing figures are considered to be schematic, unless specifically indicated otherwise.

DETAILED DESCRIPTION

In this disclosure, all "aspects," "examples," "embodiments," and "implementations" described are considered to be non-limiting and non-exclusive. Accordingly, the fact that a specific "aspect," "example," "embodiment," or "implementation" is explicitly described herein does not exclude other "aspects," "examples," "embodiments," and "implementations" from the scope of the present disclosure even if not explicitly described. In this disclosure, the terms "aspect," "example," "embodiment," and "implementation" are used interchangeably, i.e., are considered to have interchangeable meanings.

In this disclosure, the term "substantially," "approximately," or "about," when modifying a specified numerical value, may be taken to encompass a range of values that include +/−10% of such numerical value.

Figure 2A:
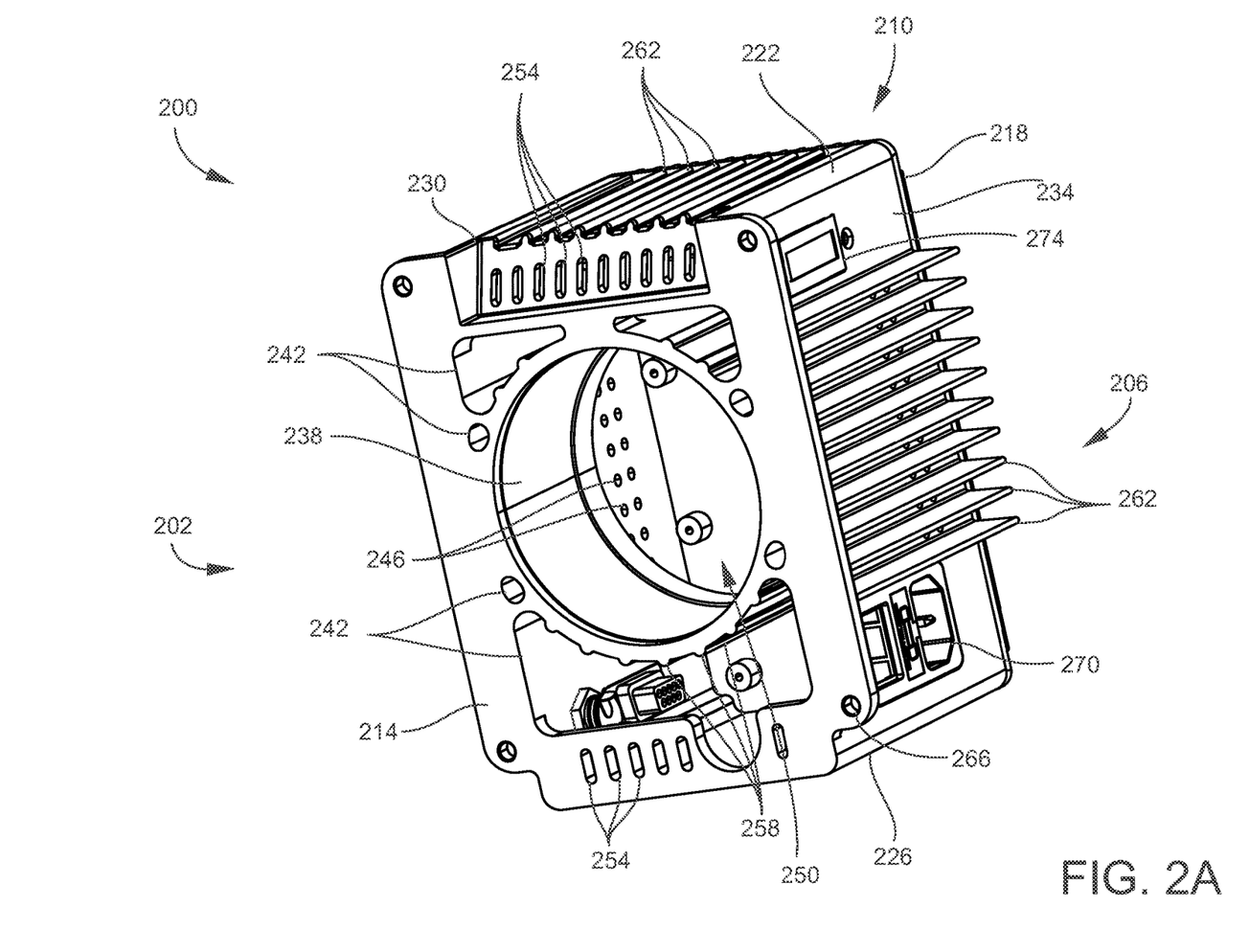
FIG. 2A is a perspective view of an enclosure for a fluid pump according to an implementation of the present disclosure.
Figure 2B:
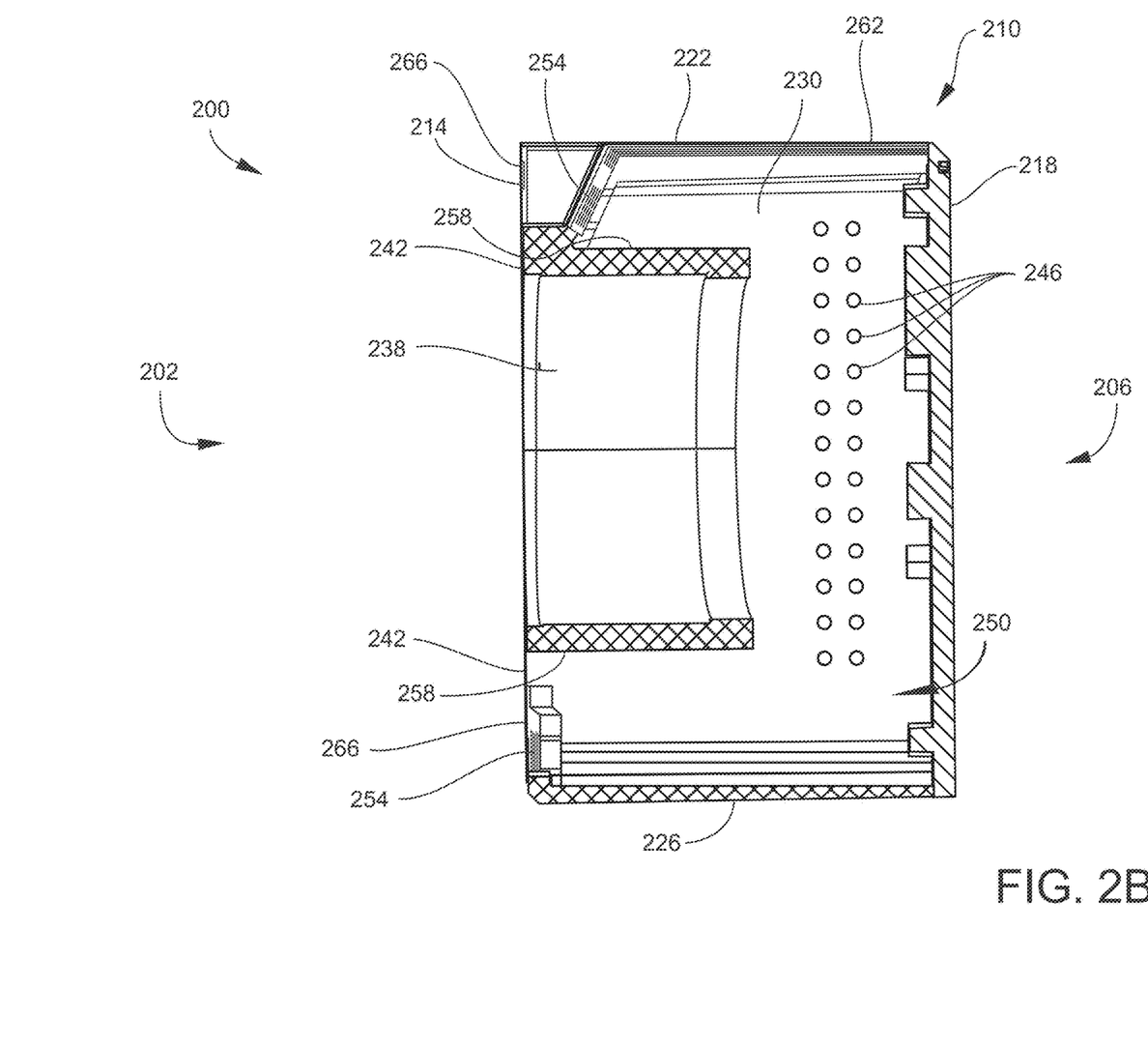
FIG. 2B is a cross-sectional side view of the enclosure illustrated in FIG. 2A.

FIG. 2A is a perspective view of an enclosure 200 for a fluid pump according to an implementation of the present disclosure. FIG. 2B is a cross-sectional side view of the enclosure 200. The enclosure 200 generally has a front side 202 and a rear side 206. When assembled to a fluid pump, the front side 202 faces toward the pump head and the rear side 206 faces away from the pump head. Depending on its geometry or shape, the enclosure 200 has one or more additional sides (e.g., top, bottom, lateral, etc.) between the front side 202 and the rear side 206. The enclosure 200 is defined by one or more bodies constructed from one or more solid materials, except that the body or bodies may have one or more holes (or openings) passing through the body or bodies.

The enclosure 200 includes an outer shell 210 that defines (encloses) an enclosure interior. The enclosure 200 and outer shell 210 may have any geometry or shape. In the illustrated example, the enclosure 200 and outer shell 210 generally have a rectilinear (e.g., box) geometry or shape. In this example, the outer shell 210 includes a front wall (or plate) 214 located at the front side 202, a rear wall (or plate) 218 located at the rear side 206, and one or more side walls (or plates) extending in an axial direction away from the front wall 214 and between the front wall 214 and the rear wall 218. In the illustrated example, the side walls include a top wall (or plate) 222 located between the front wall 214 and the rear wall 218, and a bottom wall (or plate) 226 located between the front wall 214 and the rear wall 218. Also in this example, the outer shell 210 includes two lateral (side) walls 230 and 234 opposing each other, each being located between the front wall 214 and the rear wall 218 and also between the top wall 222 and the bottom wall 226. The outer shell 210 may have a single-piece construction, i.e., comprise a single body of material. In other words, each wall (front wall 214, rear wall 218, top wall 222, bottom wall 226, lateral wall 230, and lateral wall 234) may be integrally adjoined to at least one other wall. Alternatively, one or more of the walls may be physically separate from the other walls, but attached to at least one other wall by appropriate attachment elements (e.g., bolts, etc.). In the illustrated example, the front wall 214, top wall 222, bottom wall 226, lateral wall 230, and lateral wall 234 are integral with each other, while the rear wall 218 is removably attached (e.g., by threaded connectors) to one or more of the top wall 222, bottom wall 226, lateral wall 230, and lateral wall 234, as needed to cover the rear side 206 of the enclosure 200. This configuration facilitates access to the enclosure interior by allowing the rear wall 218 to be removed individually, i.e., without needing to remove the entire outer shell 210.

The enclosure 200 further includes a stator holder 238 positioned in the enclosure interior and surrounded by the one or more side walls (e.g., top wall 222, bottom wall 226, lateral wall 230, and lateral wall 234). The stator holder 238 defines (surrounds) a stator holder interior. After assembly, the motor stator and motor rotor of a motor (not shown, but see FIG. 3) are positioned in the stator holder interior, such that the stator holder 238 at least partially surrounds the motor stator. The stator holder 238 is configured (e.g., sized, shaped, etc.) to securely hold the motor stator. For this purpose, the motor stator may be attached to (or in secure contact with) the stator holder 238 by any suitable method, such as press-fitting for example. In a typical implementation, the motor rotor at least partially (e.g., concentrically) surrounds a drive shaft (not shown, but see FIG. 3) and the motor stator at least partially (e.g., concentrically) surrounds the motor rotor. In a typical implementation, the motor stator and motor rotor have generally cylindrical shapes. Accordingly, and in the illustrated example, the stator holder 238 has a cylindrical shape.

In the illustrated example, the outer shell 210 and the stator holder 238 are integrally adjoined as a single-piece (single-body) construction (configuration). More particularly in the illustrated example, the stator holder 238 is adjoined to at least one of the front wall 214 and/or the one or more side walls (e.g., top wall 222 and/or bottom wall 226 and/or lateral wall 230 and/or lateral wall 234) as a single-piece construction. The single-piece construction may enhance the removal of heat energy from the motor (inside the stator holder 238) via heat conduction from the body of the stator holder 238 to the body of the outer shell 210. To enhance heat transfer from the motor, the enclosure 200 (outer shell 210 and stator holder 238) may be composed of a highly thermally conductive material, examples of which include, but are not limited to, metals (e.g., aluminum, etc.) and metal alloys (e.g., stainless steel, etc.). Any appropriate fabrication technique may be utilized to achieve a single-piece construction in which the outer shell 210 and the stator holder 238 are integral with each other. As one example, the enclosure 200 may be fabricated by a casting process in the case where a metal or metal alloy is utilized, as appreciated by persons skilled in the art.

In an alternative implementation, the outer shell 210 and the stator holder 238 may be physically separate components, with the stator holder 238 being appropriately mounted in the enclosure interior, such as by attachment to the outer shell 210 and/or the pump head.

As noted above, the body or bodies of material comprising the enclosure 200 (outer shell 210 and/or stator holder 238) may have one or more holes (or openings) passing through the body or bodies. In the illustrated example, such holes include a plurality of air conduits 242 configured (e.g., sized, shaped, oriented, etc.) to direct air through the enclosure interior in one or more directions, typically from the rear side 206 to the front side 202. The air conduits 242 may run from a position in the enclosure interior to (or generally toward) the front wall 214. The holes also include a plurality of air inlets 246 positioned to allow air to flow from the ambient space (the space outside of the enclosure 200) into the enclosure interior. In the illustrated example, the air inlets 246 are located at the lateral walls 230 and 234 to allow ambient air to flow into a rear section 250 of the enclosure interior that is between the stator holder 238 and the rear wall 218. Alternatively or additionally, one or more air inlets 246 may be located at the rear wall 218 or the top wall 222. The holes further include a plurality of air outlets 254 positioned to allow air to flow from the enclosure interior to the ambient space. In the illustrated example, the air outlets 254 are located at portions of the front wall 214 and/or the top wall 222 that are not obstructed by the pump head. By the configuration just described, an example of which is illustrated in FIGS. 2A and 2B, the enclosure 200 defines (or provides, or includes) a plurality of air flow paths running from at least some of the air inlets 246, to and through the air conduits 242, and from the air conduits 242 to at least some of the air outlets 254.

The air flows are effective to remove heat energy from the motor via heat convection. Moreover, the air flows are effective to remove heat energy from any electronics that may be positioned directly in the enclosure interior together with the motor, as described below in conjunction with FIG. 3. As also described below in conjunction with FIG. 3, to enhance the air flows through the enclosure interior, a cooling fan may be mounted inside the enclosure interior. To further enhance the cooling effect of the air flowing inside the enclosure 200, internal cooling fins 258 may be provided in the enclosure interior. In the illustrated example, at least some of these internal cooling fins 258 extend outwardly from the outside surface of the stator holder 238. Additionally, to enhance the cooling effect of the ambient air proximate to the outer surface(s) of the enclosure 200, external cooling fins 262 may be provided on one or more outside surfaces of the enclosure 200. In the illustrated example, at least some of these external cooling fins 262 extend outwardly from outside surfaces of the outer shell 210, in particular the rear wall 218, top wall 222, and lateral walls 230 and 234.

The enclosure 200 may also include one or more mounting features configured to allow the enclosure 200 to be securely attached to the pump head. Any type of mounting features suitable for this purpose may be provided. In the illustrated example, the front wall 214 includes one or more mounting holes 266 serving as mounting features for attaching the enclosure 200 to the pump head. For example, the mounting holes 266 may receive bolts that are threaded into corresponding threaded bores of the pump head, thereby clamping the enclosure 200 to the pump head.

The enclosure 200 may also include one or more electrical interconnects 270, such as may be mounted to the outer shell 210 as electrical feedthroughs, configured to be coupled to a power source for providing electrical power to the motor (and also the electronics, if provided), and/or coupled to an external electronic device for enabling the transmission of data and/or control signals. For such purposes, internal wiring (e.g., cables; not shown) are provided in the enclosure interior to connect the electrical interconnect(s) 270 to the motor or additionally to the electronics (if provided). The enclosure 200 may also include one or more user interfaces 274 mounted at the outer shell 210 to display output information to a user and/or enable input by the user. As one example, the user interface 274 may be or include an indicator that displays the total number of hours of operation of the motor.

Figure 3:
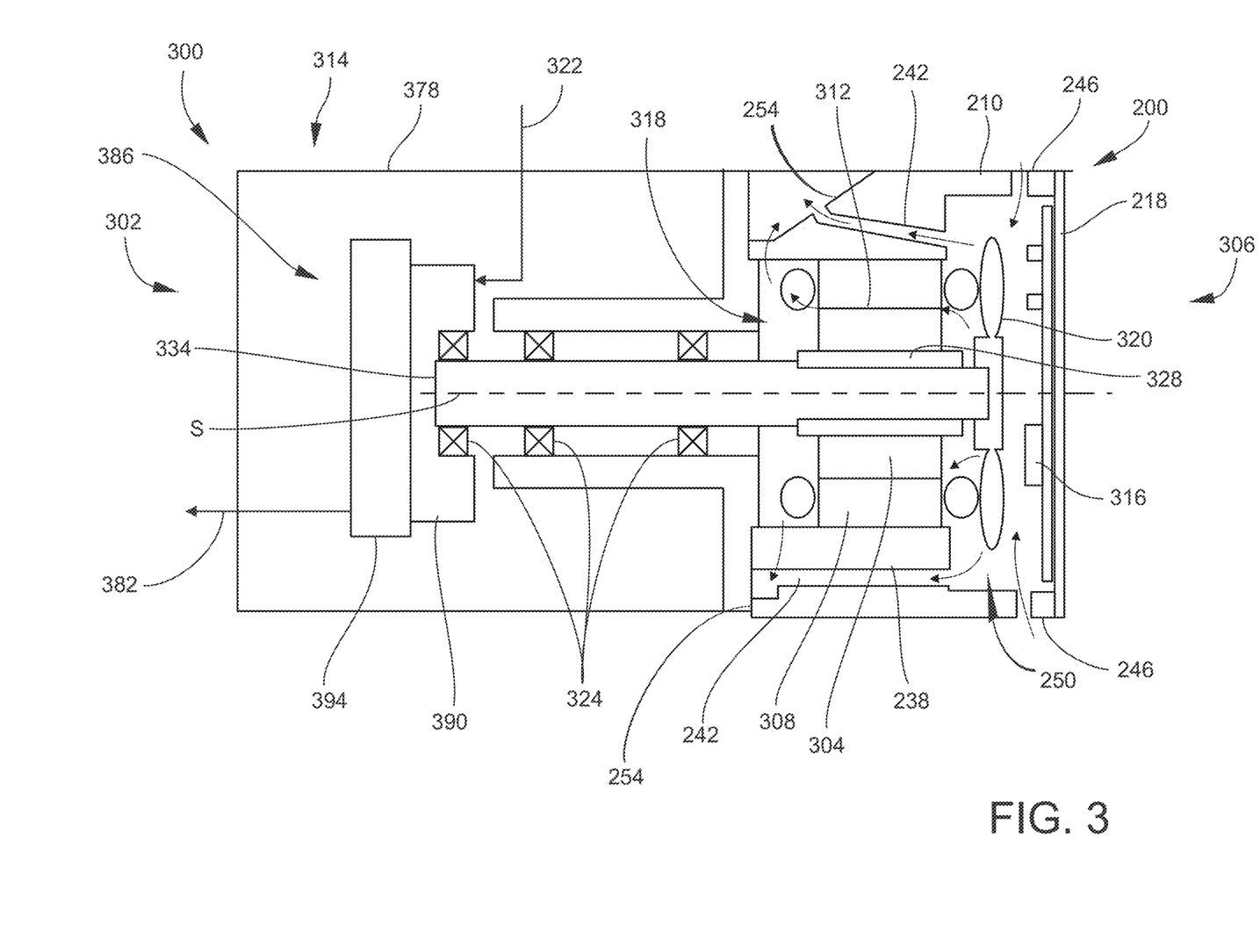
FIG. 3 is a cross-sectional, longitudinal side view of an example of a fluid pump according to an implementation of the present disclosure.

FIG. 3 is a cross-sectional, longitudinal side view of an example of a fluid pump 300 according to an implementation of the present disclosure. Depending on the implementation, the fluid pump 300 may be configured to operate as a vacuum pump or a fluid compressor. Generally, previously known components, structures, functions, and operations of fluid pumps of the types described herein are understood by persons skilled in the art, and thus need not be described in detail herein. Accordingly, certain components of the fluid pump 300 are described only briefly herein to provide a relevant context for the presently disclosed subject matter.

The fluid pump 300 generally includes a pump head (assembly) 314, a motor (assembly) 318, and a drive shaft 334 rotatable about a drive axis S. The drive shaft 334 may be a single shaft or a motor shaft and a pump shaft coupled together (such as by a mechanical coupling, or a non-contact coupling such as a magnetic coupling). For reference and description, the fluid pump 300 is considered to have a longitudinal device axis coincident with the drive axis S relative to which various components of the fluid pump 300 are positioned. The drive axis S (or device axis) is not necessarily the geometrical center axis of the fluid pump 300. In the context of the present disclosure, the terms "axial" and "axially" are considered to be relative to the drive axis S (or device axis), unless specified otherwise or the context dictates otherwise. Also for reference and description, the fluid pump 300 is considered to generally have a front end (or front side) 302 and a rear end (or rear side) 306 axially opposite to the front end 302. The pump head 314 is closer to the front end 302 than the motor 318, and the motor 318 is closer to the rear end 306 than the pump head 314. The "front" end (or front side) of any component of the fluid pump 300 is considered to be the end or side facing generally toward the front end 302. The "rear" end (or rear side) of any component of the fluid pump 300 is considered to be the end or side facing generally toward the rear end 306. From the perspective of FIG. 1, the front end 302 is on the left and the rear end 306 is on the right. However, the fluid pump 300 is not limited to any particular orientation relative to a horizontal plane (e.g., the ground or surface on which the fluid pump 300 rests) or a vertical plane, or relative to any other reference datum.

The pump head 314 may include a structural frame (or housing) 378, which may have a single-piece configuration or be an assembly of two or more frame sections. Various pump components may be attached to or integral with, and/or enclosed by, the frame 378. The pump head 314 may also include an outer cowling (not shown), which may have a single-piece configuration or be an assembly of two or more cowling sections. The cowling may enclose at least part of the axial length of the pump head 314. The cowling may include one or more openings as needed to accommodate one or more fluid conduits, electrical wiring, etc., one or more vents for allowing air flow into or out from the interior of the pump head 314, etc. A pump base or tray (not shown) supporting the pump head 314 (or additionally the motor 318) may cooperate with the cowling to fully enclose the pump head 314. The pump head 314 and the motor 318 may be supported by vibration-damping pump mounts positioned between the underside of the pump head 314 and motor 318 and the tray.

The pump head 314 includes a pump inlet (working fluid inlet) 322, a pump outlet (working fluid outlet) 382, and one or more pumping stages 386. The pump inlet 322 may fluidly communicate with any source of a working fluid (gas or liquid) to be pumped by the fluid pump 300. As examples, a source of working fluid may be a vacuum chamber (a chamber to be evacuated, i.e., pumped down to a sub-atmospheric pressure), a container or pipe containing a fluid to be compressed (and/or to be transported at a desired pressure and/or flow rate), or an open space containing a fluid to be compressed (e.g., ambient air). The pump inlet 322 may schematically represent one or more fluid conducting components (pipes, passages, chambers, valves, etc.) utilized to supply the working fluid to the pumping stage 386 (or the first pumping stage in the case of multiple pumping stages). For example, the pump inlet 322 may represent one or more fluid conduits that pass through the frame 378 of the pump head 314 and into an inlet region of the pump head 314 that is on the inlet side of the (first) pumping stage 386. The inlet region may be a low-pressure region. The pump outlet 382 may fluidly communicate with any destination intended to receive the working fluid outputted by the pump head 314, such as a container (e.g., pressure vessel) or pipe, a downstream device, a tool or system that utilizes the outputted fluid in a given process, or an open space (e.g., in a case where air or other non-toxic fluid is being evacuated from a vacuum chamber). The pump outlet 382 may schematically represent one or more fluid conducting components (pipes, passages, chambers, valves, etc.) utilized to conduct outputted fluid away from the pumping stage 386 (or the last pumping stage in the case of multiple pumping stages). For example, the pump outlet 382 may represent one or more fluid conduits that pass through the frame 378 of the pump head 314 from an outlet region of the pump head 314 that is on the outlet side of the (last) pumping stage 386. The outlet region may be a high-pressure region. In the context of this disclosure, the terms "low-pressure" and "high-pressure" are relative to each other. That is, fluid pressure in the low-pressure region (or inlet side) is lower than the fluid pressure in the high-pressure region (or outlet side), and vice versa.

The pumping stage(s) 386 include one or more movable pump elements 390 that move relative to one or more stationary pump components, or pump stators 394. Generally, the pumping stage(s) 386 are configured to pump the working fluid from the pump inlet 322 to the pump outlet 382 in response to movement of the movable pump element(s) 390. The movable pump element(s) 390 cooperate with the pump stator(s) 394 to perform work on the working fluid. The movable pump element(s) 390 and the pump stator(s) 394 cooperatively define one or more fluid flow paths through which the working fluid is conducted (pumped) through the pumping stage(s) 386, as appreciated by persons skilled in the art. In the illustrated example, the pump head 314 includes a single pumping stage 386 (i.e., with a single movable pump element 390).

Depending on the type of movable pump element 390, its movement may involve any combination of orbiting, rotation, and/or linear translation in any or all of six degrees of freedom. Examples of the movable pump element 390 include, but are not limited to, an orbiting scroll, a rotary vane component, a crank, a cam, a gear, a screw, a Roots rotor (e.g., lobe), a claw, an impeller, a compressor wheel, a fan, and a piston, all of which are generally understood by persons skilled in the art.

Generally, the pump stator 394 may be any stationary portion of the pump head 314 configured to interface with the movable pump element 390 to generate a pumping action on the working fluid. In the present example, the pump stator 394 is attached to, or is an integral part of, the frame 378.

Generally, the motor 318 is configured to generate rotational power and transfer it to the drive shaft 334, which in turn transfers the power to the movable pump element 390 via an appropriate mechanical interface that either rotates the movable pump element 390 directly about the drive axis S or converts the shaft rotation into another type of movement (e.g., orbiting, linear translation, etc.). For this purpose, the motor 318 may be any type of motor suitable for powering a pump head 314 of the types described herein. In a typical example and as illustrated, the motor 318 is an electric motor that includes one or more components communicating with a suitable electrical power input. In the illustrated example, the motor 318 is a brushless direct-current (BLDC) motor powered by an alternating-current (AC) power module, but other types of motors with specifications appropriate for use in the fluid pump 300 may be utilized (e.g., brushed DC motor, AC motor, inverter-driven motor, etc.).

In the illustrated example, the motor 318 includes a motor rotor 304 and a motor stator 308. The motor rotor 304 is coupled to, and at least partially surrounds, the drive shaft 334. The motor stator 308 at least partially surrounds the motor rotor 304. The motor rotor 304 and the motor stator 308 each may have a single-piece configuration or may include separate portions attached to or spaced from each other. In the illustrated example, the motor rotor 304 and the motor stator 308 are spaced from each other by a radial (and annular) gap 312 (the term "radial" referring a direction orthogonal to the drive axis S). Depending on the configuration, the motor rotor 304 and the motor stator 308 may include electrically conductive windings, electromagnets, and/or permanent magnets as needed to magnetically couple the motor rotor 304 and the motor stator 308 with a magnetic field. The magnetic field is oriented such that in response to an input of electrical power to the motor rotor 304 or the motor stator 308 (depending on the configuration), the motor rotor 304 rotates about the drive axis S and thereby rotates the drive shaft 334 about the drive axis S. A cylindrical shield (not shown) composed of an electrically insulating and non-magnetic material (e.g., a suitable plastic) may be positioned in the radial gap to protect the motor stator 308 from contaminants (dust, metal particles, other particulates, oil, etc.) that may be present in the vicinity of the drive shaft 334.

According to an implementation, instead of including a conventional housing for the motor 318, the fluid pump 300 includes an enclosure 200, which may be the same as or similar to the enclosure 200 described above and illustrated in FIG. 2. Accordingly, the enclosure 200 may include an outer shell 210 defining an enclosure interior, a stator holder 238 disposed in the enclosure interior and at least partially surrounding the motor stator 308 (and motor rotor 304 in this example), and a plurality of air conduits (e.g., at 242) configured to direct air through the enclosure interior in one or more directions from the rear side to the front side of the enclosure 200 (or from the rear end 306 toward the front end 302 indicated in FIG. 3). In the present example, the annular gap 312 between the motor rotor 304 and the motor stator 308 serves as one or the air conduits 242. Additionally, the outer shell 210 may include a plurality of air inlets (e.g., at 246) positioned to allow air to flow from an ambient space outside of the enclosure 200 into the enclosure interior, and a plurality of air outlets (e.g., at 254) positioned to allow air to flow from the enclosure interior to the ambient space. By this configuration, as described above, the enclosure 200 defines a plurality of air flow paths running from at least some of the air inlets 246, to and through the air conduits 242, and from the air conduits 242 to at least some of the air outlets 254. At least some of the air flow paths are represented by arrows in FIG. 3.

The fluid pump 300 also includes an electronics assembly 316 configured to control controllable components of the fluid pump 300 and perform any other functions associated with the operation of the fluid pump 300 (e.g., supplying electrical power, enable data/signal transmission, etc.), as appreciated by persons skilled in the art. As a few examples, the electronics assembly 316 may include one or more of: circuit board(s) (e.g., PCB(s)) supporting various electronic components/circuitry such as an inverter, voltage regulator, transformer, electronic processor/controller, microcontroller, integrated circuit (IC) chips, inductors, capacitors, resistors, transistors, memories, etc., as well as user interface (s) and interfaces for data logger(s), sensor(s), etc. According to an implementation, instead of positioning the electronics assembly 316 in an electronics box separate from the pump head 314 and the motor 318 (such as described above and illustrated in FIG. 1), the electronics assembly 316 is disposed in the enclosure interior. In the illustrated example, the electronics assembly 316 is mounted to the rear wall 218, but alternatively may be mounted elsewhere in the enclosure interior. The fluid pump 300 also includes a cooling fan 320 disposed in the enclosure interior. In the present example, the cooling fan 320 is mounted to, and thereby rotated by, the drive shaft 334. In this case, the cooling fan 320 may also include one or more counterweights (not shown) if needed for the particular type of fluid pump 300. Alternatively, the cooling fan 320 may be positioned separately from the drive shaft 334 and powered by a dedicated fan motor provided in the enclosure interior.

The enclosure 200 described herein and illustrated in FIGS. 2 and 3 may provide one or more advantages. The enclosure 200 may serve as a housing for both the motor 318 and the electronics assembly 316, and also may be integrated with the stator holder 238. Such configuration may be compact, and may reduce the number of parts (hardware, components) required, simplify the assembly process, shorten the lengths of cables. Such configuration also may eliminate the need for a separate cooling system for the electronics assembly 316, i.e., only a single cooling system may be required at the motor end of the fluid pump 300. Moreover, the bodies of material constituting the enclosure 200, particularly the outer shell 210 and the stator holder 238, may be integrated as a single-piece or single-body construction (e.g., cast metal or metal alloy), thereby enhancing the removal of heat energy from the motor 318 via the conduction mode of heat transfer through the solid material. The conductive heat transfer may be enhanced by fabricating the outer shell 210 and stator holder 238 from a highly thermally conductive material such as a metal or metal alloy. The conductive heat transfer also may be enhanced by providing the cooling fan 320. Several air flow paths may be established through the enclosure interior, including from air inlets 246 to air outlets 254, thereby enhancing the removal of heat energy from the motor 318 and the electronics assembly 316 via the convection mode of heat transfer through the internal air spaces of the enclosure 200. The convective heat transfer may be enhanced by providing the cooling fan 320 and also an arrangement of internal cooling fins 258 and/or external cooling fins 262. The convective heat transfer also may be effective to maintain the outer surface(s) of the enclosure 200 (which may be touchable by a user) at reduced temperatures to protect the user. The use of a metal or metal alloy for the enclosure 200 also may reduce and/or shield electronic noise (e.g., EMC/EMI) generated by the motor 318 and the electronics assembly 316. Moreover, the enclosure 200 may serve as a complete housing for the motor 318 and the electronics assembly 316, thereby eliminating the need for a separate cowling to enclose the motor 318 and the electronics assembly 316. For example, if the fluid pump 300 includes a cowling that encloses the pump head 314 (see, e.g., FIG. 1), that cowling need not be extended over the enclosure 200, but rather may terminate at or be attached to the enclosure 200.

In some implementations, the fluid pump 300 may include additional structures (not shown) that enclose one or more of the components of the pump head 314 and/or the motor 318 in a hermetically sealed manner, as appreciated by persons skilled in the art.

In some implementations, the movable pump element 390 is not a pump "rotor" in the sense of rotating directly on the drive axis S, but instead is an orbiting pump element such as, for example, an orbiting scroll or a rotary vane-holding element, as appreciated by persons skilled in the art. That is, instead of rotating directly on the drive axis S, the movable pump element 390 may be configured to orbit at a radial offset distance around the drive axis S. In this case, the drive shaft 334 at its front shaft end may include (may be integral with or coupled to) an eccentric member (or crank; not shown but see FIG. 4) that is coupled to the movable pump element 390. A non-limiting example of an orbiting pump element in the context of a scroll pump is described further below in conjunction with FIGS. 4 and 5.

The fluid pump 300 typically includes a plurality of bearings located along different axial positions that are configured to support the rotation of the drive shaft 334 or the motion of the movable pump element 390, and/or configured to bear axial (e.g., thrust) forces generated during operation of the fluid pump 300. Such bearings may have any configuration appropriate for their function such as, for example, roller bearings, thrust bearings, bushings, etc. In the illustrated example, the fluid pump 300 includes a number of pump-side bearings 324 and at least one motor-side bearing 328, all of which are attached to (e.g., by press-fitting) the drive shaft 334. In the present example, the motor-side bearing 328 is a cylindrical or sleeve-type bushing.

In some implementations, the fluid pump 300 may generate forces during operation that may cause force imbalances, which may cause instabilities during operation such as excessive vibration, shaking, etc., of one or more components of the fluid pump 300. Such imbalances may thus lead to premature wear or failure of one or more components of the fluid pump 300, loosening of fasteners, detachment or delamination of components, etc. In particular, orbiting pump components can generate force imbalances. The bearings provided with a pump (e.g., bearings 324 and 328) are not designed to address the problem of force imbalance. In some implementations, the fluid pump 300 includes a rotatable (front or first) counterweight (not shown, but see FIG. 4) configured to (fully or partially) counterbalance the imbalance during operation. The counterweight is attached to (e.g., by press-fitting), and hence rotates with, the drive shaft 334. Typically, the counterweight is positioned in the pump head 314 near the movable pump element 390.

Figure 4:
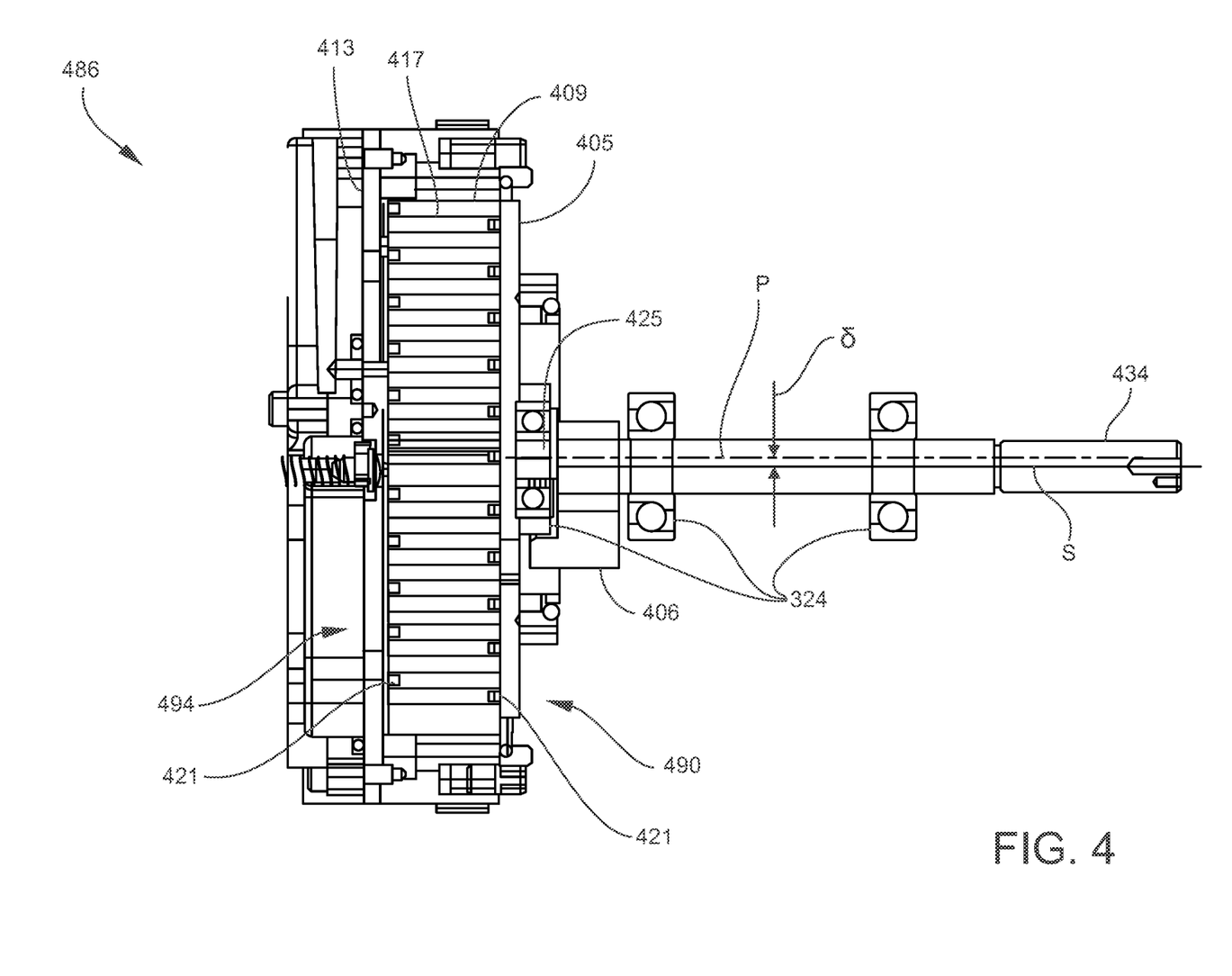
FIG. 4 is a cross-sectional, longitudinal side view of an example of a pumping stage and a drive shaft according to an implementation of the present disclosure.

FIG. 4 is a cross-sectional, longitudinal side view of an example of a pumping stage 486 and a drive shaft 434 according to another implementation. The pumping stage 486 and the drive shaft 434 may be utilized in a fluid pump such as the fluid pump 300 described above and illustrated in FIG. 3.

The pumping stage 486 includes a movable pump element in the form of an orbiting plate scroll 490 and a pump stator in the form of stationary plate scroll 494. The orbiting plate scroll 490 orbits around the drive axis S relative to the stationary plate scroll 494 in the manner described above. Specifically, the orbiting plate scroll 490 includes an orbiting plate 405 that orbits in the transverse plane (orthogonal to the drive axis S as described above). The orbiting plate scroll 490 further includes an orbiting scroll blade 409 that extends (or projects) axially in the direction from the orbiting plate 405 toward the stationary plate scroll 494. The stationary plate scroll 494 includes a stationary plate 413, and a stationary scroll blade 417 that extends (or projects) axially in the direction from the stationary plate 413 toward the orbiting plate scroll 490. In the present example, to achieve the orbiting motion of the orbiting plate scroll 490, the drive shaft 434 at its front shaft end may include (may be integral with or coupled to) an eccentric member (or crank) 425 that is coupled to the orbiting plate scroll 490. In FIG. 4, the eccentricity is shown by a central axis P of the orbiting plate scroll 490 (and of the eccentric member 425) being radially offset from the drive axis S by an offset distance δ.

The orbiting scroll blade 409 and the stationary scroll blade 417 are shaped as spirals (i.e., run along a spiral path) in the transverse plane, as appreciated by persons skilled in the art. The cross-sectional view of FIG. 4 shows the several turns or wraps of the spiral-shaped orbiting scroll blade 409 and stationary scroll blade 417. As illustrated, the orbiting scroll blade 409 is juxtaposed with the stationary scroll blade 417 in the radial direction (relative to the drive axis S or device axis), such that the orbiting scroll blade 409 and the stationary scroll blade 417 are nested together with a clearance and a predetermined relative angular positioning. By this configuration, one or more pockets are defined in the pumping stage 486 by (and between) the nested orbiting scroll blade 409 and stationary scroll blade 417. The volume(s) of the pocket(s) vary as the orbiting scroll blade 409 orbits relative to the stationary scroll blade 417. Consequently, the working fluid is drawn into the pump inlet 322 (FIG. 3), through the pumping stage(s) 486, and to the pump outlet 382 (FIG. 3). In the pumping stage(s) 486, the working fluid is compressed in and by the pocket(s) as their volume(s) are reduced during one or more portions of the orbiting cycle of the orbiting plate scroll 490.

The axial tips of the orbiting scroll blade 409 and the stationary scroll blade 417 each may include a groove 525 (FIG. 5) in which a tip seal 421 is seated. Thus, the tip seal 421 runs along the same spiral path as the orbiting scroll blade 409 or the stationary scroll blade 417. The tip seal 421 of the orbiting plate scroll 490 is positioned between the orbiting scroll blade 409 and the stationary plate 413, and contacts the stationary plate 413 to thereby create an axial seal between the orbiting scroll blade 409 and the stationary plate 413. The tip seal 421 of the stationary plate scroll 494 is positioned between the stationary scroll blade 417 and the orbiting plate 405, and contacts the orbiting plate 405 to thereby create an axial seal between the stationary scroll blade 417 and the orbiting plate 405. The tip seals 421 are typically composed of a plastic.

The orbiting plate scroll 490 is an example of a pump component that creates a force imbalance during operation due to its orbiting motion. In the present example, this may be addressed by providing a counterweight 406 attached to the drive shaft 434. Optionally, another counterweight (not shown) may be provided at the other end of the drive shaft 434 where the enclosure 200 is located, as described above.

Figure 5:
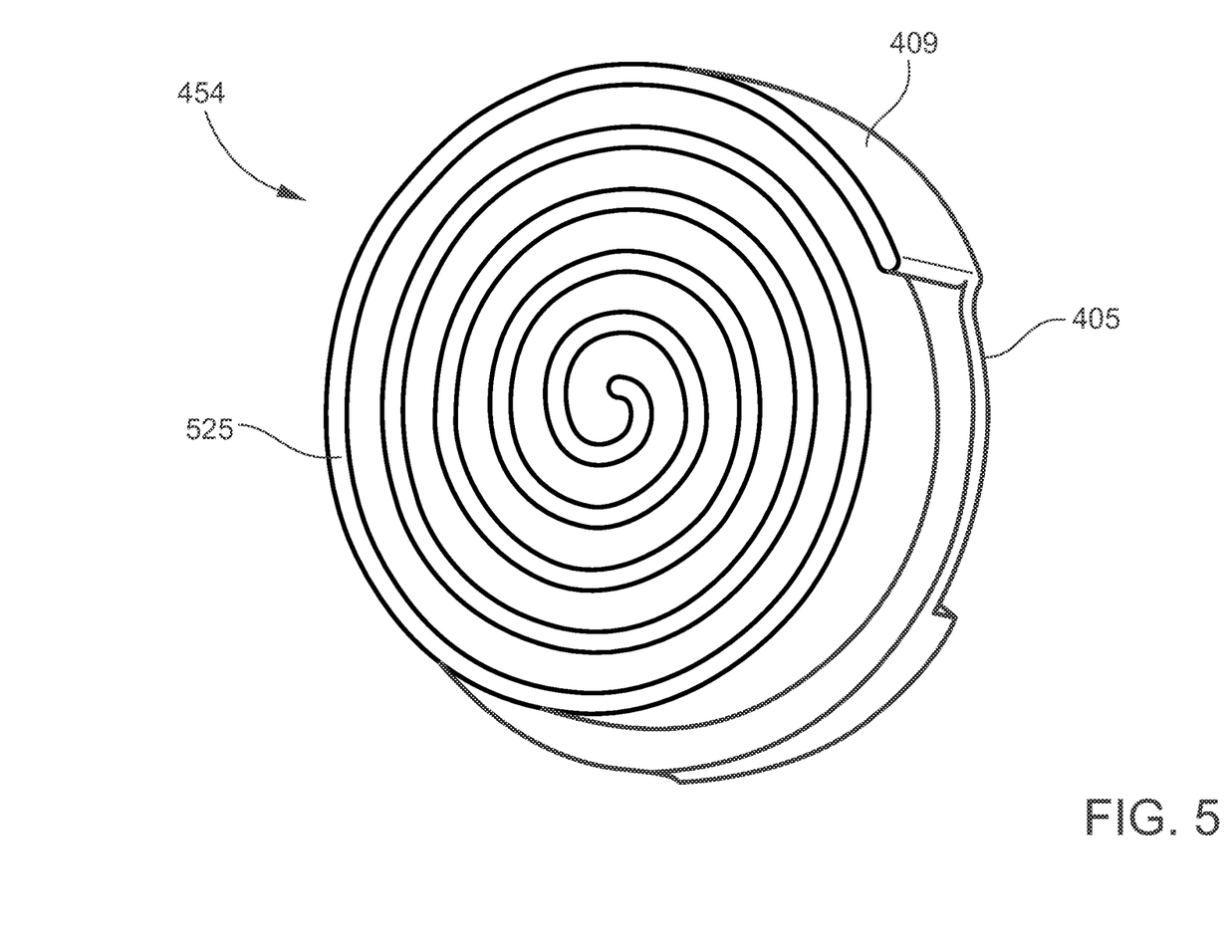
FIG. 5 is a perspective view of an example of an orbiting plate scroll that may be provided in the pumping stage illustrated in FIG. 4, according to an implementation of the present disclosure.

FIG. 5 is a perspective view of an example of an orbiting plate scroll 490 that may be provided in the pumping stage 486 illustrated in FIG. 4, according to an implementation of the present disclosure. In particular, FIG. 5 shows the spiral shape of the orbiting scroll blade 409. The spiral shape of the stationary scroll blade 417 may be the same or similar. FIG. 5 also shows the spiral groove 525 formed at the tip of the orbiting scroll blade 409, in which the tip seal 421 is seated as described above.

Scroll pumps are further described in, for example, U.S. Pat. No. 9,341,186 and U.S. Patent Application Pub. No. 2015/0078927, the entire contents of each of which are incorporated by reference herein.

It will be understood that terms such as "communicate with" and "in . . . communication with" (for example, a first component "communicates with" or "is in communication with" a second component), as well as "coupled to" or "coupled with," are used herein to indicate a structural, functional, mechanical, electrical, signal, optical, magnetic, electromagnetic, ionic or fluidic relationship between two or more components or elements. As such, the fact that one component is said to communicate with or be coupled to/with a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A motor enclosure for housing a motor of a fluid pump, the motor enclosure comprising:
an outer shell defining an enclosure interior and comprising a front side and a rear side, wherein the front side is removably attachable to a separate pump head enclosure for housing a pump head of the fluid pump, the rear side is axially opposite to the front side, the enclosure interior is axially between the front side and the rear side, and the outer shell is external to the pump head enclosure;
a stator holder disposed in the enclosure interior and configured to hold a motor stator, wherein the outer shell is configured to surround the motor stator, and the stator holder is monolithically adjoined to the outer shell as a single-piece construction;
an electronics assembly disposed in a portion of the enclosure interior axially between the stator holder and the rear side;
a cooling fan disposed in the portion of the enclosure interior axially between the stator holder and the rear side; and
a plurality of air conduits configured to direct air through the enclosure interior, wherein:
the outer shell comprises a plurality of air inlets positioned to allow air to flow from an ambient space outside of the motor enclosure directly into the enclosure interior in an unheated condition, and a plurality of air outlets positioned to allow air to flow from the enclosure interior to the ambient space;
the motor enclosure defines a plurality of air flow paths running from at least some of the air inlets, to and through the air conduits, and from the air conduits to at least some of the air outlets; and
one or more of the air flow paths are directed such that air in the one or more air flow paths contacts the electronics assembly to remove heat therefrom.

2. The motor enclosure of claim 1, comprising a motor, wherein the motor comprises the motor stator and a motor rotor.

3. The motor enclosure of claim 2, wherein the motor stator at least partially surrounds the motor rotor.

4. The motor enclosure of claim 2, wherein the motor stator and the motor rotor are separated by an annular gap, and the annular gap is configured to conduct air through the enclosure interior.

5. The motor enclosure of claim 1, wherein the stator holder is cylindrical.

6. The motor enclosure of claim 1, wherein:
the outer shell comprises a front wall and one or more side walls defining the enclosure interior, wherein the front wall is configured to attach the motor enclosure to the pump head and to separate the enclosure interior from the pump head, and the one or more side walls extend in an axial direction away from the front wall;
the outer shell and the stator holder are composed of a metal or metal alloy; and
the stator holder is monolithically adjoined to at least one of the front wall or the one or more side walls as the single-piece construction.

7. The motor enclosure of claim 1, comprising a plurality of cooling fins disposed in the enclosure interior and extending outwardly from the stator holder.

8. The motor enclosure of claim 1, comprising a drive shaft, wherein the cooling fan is mounted to and rotated by the drive shaft.

9. A fluid pump, comprising:
the motor enclosure of claim 1;
the pump head comprising a pump inlet, a pump outlet, and a movable pump element, wherein the pump head is configured to pump a fluid from the pump inlet to the pump outlet in response to movement of the movable pump element; and
a motor comprising a motor rotor and the motor stator, and configured to drive the movement of the movable pump element.

10. The fluid pump of claim 9, comprising a drive shaft coupling the motor rotor to the movable pump element and rotatable about a drive axis, wherein the movable pump element comprises an orbiting pump element configured to move in an orbiting manner around the drive axis in response to rotation of the drive shaft.

11. The fluid pump of claim 9, comprising a drive shaft coupling the motor rotor to the movable pump element, wherein:
the movable pump element comprises an orbiting scroll blade;
the pump head comprises a stationary scroll blade nested with the orbiting scroll blade; and
the orbiting scroll blade is configured to move in an orbiting manner relative to the stationary scroll blade in response to rotation of the drive shaft, to create at least one moving pocket between the orbiting scroll blade and the stationary scroll blade effective to pump fluid.

12. The fluid pump of claim 9, comprising a drive shaft coupling the motor rotor to the movable pump element and rotatable about a drive axis, wherein the movable pump element comprises a pump rotor configured to rotate about the drive axis.

13. A motor enclosure for housing a motor of a fluid pump, the motor enclosure comprising:
- an outer shell comprising a front wall, a rear wall axially opposite to the front wall, and one or more side walls extending in an axial direction between the front wall and the rear wall, wherein:
  - the front wall, the rear wall, and the one or more side walls define an enclosure interior;
  - the front wall is configured to removably attach the motor enclosure to a pump head enclosure for housing a pump head of the fluid pump and to separate the enclosure interior from the pump head;
- a stator holder configured to hold a motor stator, wherein the stator holder is disposed in the enclosure interior and surrounded by the one or more side walls, and the outer shell is configured to surround the motor stator;
- an electronics assembly disposed in a portion of the enclosure interior axially between the stator holder and the rear wall;
- a cooling fan disposed in the portion of the enclosure interior axially between the stator holder and the rear wall; and
- a plurality of air conduits configured to direct air through the enclosure interior, wherein:
  - the outer shell and the stator holder are composed of a metal or a metal alloy;
  - the stator holder is monolithically adjoined to at least one of the front wall or the one or more side walls as a single-piece construction;
  - the outer shell comprises a plurality of air inlets positioned to allow air to flow from an ambient space outside of the motor enclosure directly into the enclosure interior in an unheated condition, and a plurality of air outlets positioned to allow air to flow from the enclosure interior to the ambient space;
  - the motor enclosure defines a plurality of air flow paths running from at least some of the air inlets, to and through the air conduits, and from the air conduits to at least some of the air outlets; and
  - one or more of the air flow paths are directed such that air in the one or more air flow paths contacts the electronics assembly to remove heat therefrom.

14. A fluid pump, comprising:
- the motor enclosure of claim 13;
- the pump head disposed in the pump head enclosure and comprising a pump inlet, a pump outlet, and a movable pump element, wherein the pump head is configured to pump a fluid from the pump inlet to the pump outlet in response to movement of the movable pump element; and
- a motor comprising a motor rotor and the motor stator, and configured to drive the movement of the movable pump element.

15. The fluid pump of claim 13, wherein the rear wall is removably attached to the outer shell, and at least a portion of the electronics assembly is mounted to the rear wall.

* * * * *